March 11, 1969 MAKOTO ITO ET AL 3,432,192
STEEL PIPE TOWER USING STEEL PIPE JOINTS AND METHOD
Filed Jan. 27, 1966 FOR ASSEMBLING THE SAME
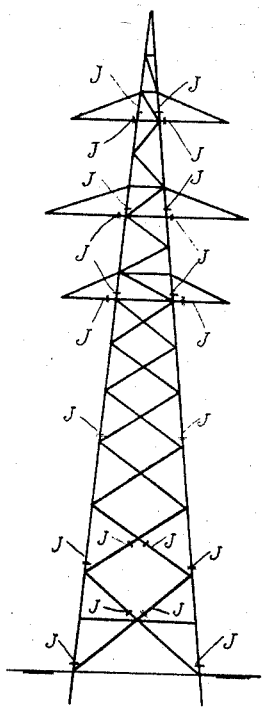
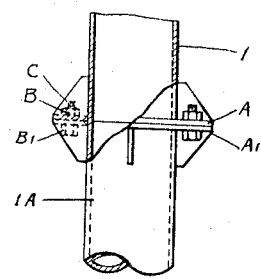
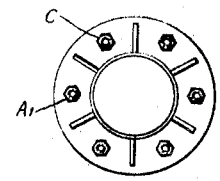
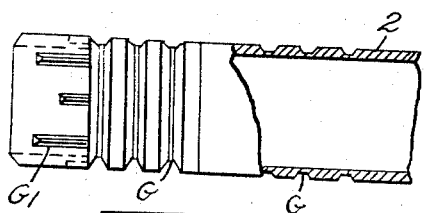
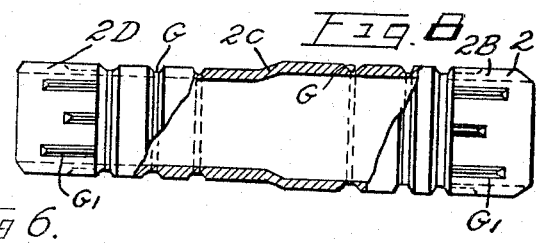
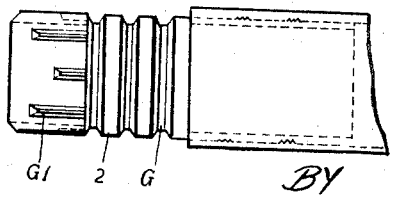
INVENTORS.
MAKATO ITO
KAZUMOTO YAMAMOTO
BY *Otto John Munz*
ATTORNEY.

INVENTOR.
MAKATO ITO
KAZUMOTO YAMAMOTO
Attorney

United States Patent Office 3,432,192
Patented Mar. 11, 1969

3,432,192
STEEL PIPE TOWER USING STEEL PIPE JOINTS AND METHOD FOR ASSEMBLING THE SAME
Makoto Ito, Kitakyushi, and Kazumoto Yamamoto, Nobeoka, Japan, assignors, by direct and mesne assignments, to Asahi Kasei Kogyo Co., Ltd.
Filed Jan. 27, 1966, Ser. No. 523,359
Claims priority, application Japan, Feb. 5, 1965, 40/5,976, 40/5,977
U.S. Cl. 285—382.2
Int. Cl. F16l *13/14;* E04h *12/10;* F16b *7/00*
9 Claims

ABSTRACT OF THE DISCLOSURE

A steel tower having explosively assembled joints and method of assembly thereof. The joints are constructed by placing circumferential and axial grooves on an anvil, sliding a pipe member of the tower onto the anvil, placing explosives on the pipe member of the tower over the location of the grooves, and exploding the explosives. The walls of the pipe member are thereby sunk into the grooves to form a tight joining of pipe member to anvil.

---

The present invention relates to a steel pipe tower and especially to one with steel pipe joints assembled by explosive forming means and to a method for constructing such steel pipe towers.

The steel pipe pillars in a steel pipe tower hitherto have been connected by means of bolted connections. However, such connections necessitate a prliminary welding of flanges and reinforcing ribs to pillar ends before any bolting can be done. The use of welding gives rise to residual stress at such joints thus giving them various problems and drawbacks. The welding procedure also requires enormous expense, consequently greatly increasing the total cost of a steel pipe tower. Also, the assembling of a steel pipe tower using bolted connections is extremely complicated and requires much labor as an unavoidable disadvantage. It is first necessary to bolt the steel pipe pillars together temporarily. Then, diagonal and horizontal braces are temporarily fixed to gusset plates on the steel pipe pillars. This temporary assembling is continued upwards and the resulting structure is intermittently corrected to eliminate lean and twist. When the completed tower is free of lean and twist, the bolts are tighetened finally. Such assembling work becomes extremely complicated and, especially at high positions, bolt fastening work is very dangerous and ineffective.

In the present invention which is intended to remove the above-described defects of prior towers, steel pipe joints using explosive forming means are employed for the purpose of connecting the steel pipe pillars in the steel pipe tower. Namely, an anvil formed with specific concave grooves is inserted in each of a pair of steel pipe pillars for joint connection or the steel pipe pillars are provided beforehand at one end with a male-type anvil formed with specific concave grooves, the male-type anvil to be inserted later into a female-type hollow portion of an other steel pipe pillar, and then, after hanging a diagonal brace and a fortifying member (horizontal member) between the steel pipe pillars, explosive means are disposed on the pillars in positions confronting at least the concave grooves of the anvil. The explosive means are exploded substantially at one time to tightly joint the steel pipe pillars by deformation thereof into the concave grooves of the anvil. Explosion is conducted by remote control from the ground. According to the present invention, therefore, it is made possible to avoid dangerous work at a high place. Steel pipe pillars are correctly connected together by means of said anvil without the central axis of either pillar being shifted. Thus there is no danger of occurrences of secondary stress at a joint due to pillar eccentricities after assembly. Further, according to the present invention, the temporary assembly of steel pipe pillars is easy to achieve with the aid of said anvil as above described and pillars can be set up accurately in the required tower forming position without torsional stressing of the structure such complicated work as temporary and final fastening work at a high place can be eliminated thus simplifying the working procedure to a remarkable degree. Again according to the present invention, the effective sectional area of a joint portion is increased due to said anvil and consequently so is its strength and rigidity.

Further, according to the present invention, the welding of flange and reinforcing ribs for bolt fastening can be dispensed with. Consequently, welding strain and residual stress are prevented. Moreover, as a whole, working expenses and cost of materials are curtailed considerably providing a steel pipe tower of cost lower than that previously possible.

Therefore an object of the present invention is to offer assembling methods of steel pipe towers using explosive forming means. Various other objects and advantages of the present invention are self-explanatory from several embodiments of the present invention which will be explained hereinafter with reference to the accompanying drawings.

FIG. 1 is a diagrammatical view of a steel pipe tower showing joint portions of steel pipe pillars.

FIG. 2 is a sectional side view of a steel pipe joint, cut away in part, using the bolt fastening of prior art.

FIG. 3 is a plan view of FIGURE 2.

FIG. 6 is a detailed side view of the male-type anvil of FIG. 4.

FIG. 7 is a cross sectional side view, broken in part, showing an example of an anvil for use as a joint thereof of the anvil of FIG. 5.

FIG. 8 shows a joint for explosive steel pipe pillars of different diameters.

Figure 4:
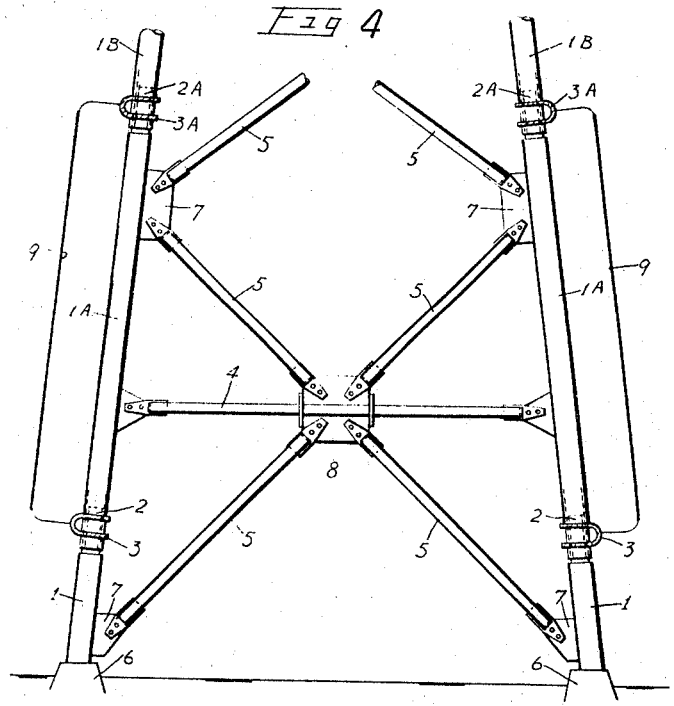
FIG. 4 is a front view showing one embodiment of the manner of assembling a steel pipe tower according to the present invention.

In the case of a steel pipe tower using steel pipes as main pillars, the steel pipe pillars are connected to each other in the positions shown at J in FIG. 1. In the prior art, as explained above, the jointing of pillars has been carried out by means of bolting as shown in FIG. 2. Namely, flanges B and B₁ having a plurality of bolt insertion holes formed therein are welded to both ends of steel pipe pillars 1 and 1A respectively and these flanges are fastened together by bolts. According to the present invention, in contrast, a steel pipe pillar is slidable onto a cylindrical male anvil in such a manner as shown in FIG. 4 that the lower end of an upper steel pipe pillar 1A is slid onto a male anvil 2 projecting fixedly at the upper end of a lower steel pipe pillar 1 and, in like manner, the female hollow portion of a steel pipe pillar 1B is also inserted onto fixed male anvil 2A steel pipe pillar 1A in a successive manner until a temporary assembly is constructed. Subsequently, diagonal braces 5 and a horizontal brace 4 are hung between the steel pipe pillars to stabilize the structure and to bring it into a lean and twist-free condition. Explosives 3 and 3A are then disposed on the external circumference of the joints at the anvils. Then an electric detonator connecting said explosives to each other by means of lead wires 9 is operated to cause the simultaneous explosion of all explosives so that said pipe pillars are compressed and deformed for tight joints on the anvils simultaneous. These explosively formed steel pipe joints can be formed by means of a simultaneous explosion of explosives throughout an entire tower after its temporary assembly, but any required number of individual explosion sequences may be carried out; for instance, a simultaneous explosion for all joints in the lower half of the tower can be executed, on reaching the halfway point of the temporary assembly work. The fixation of male anvils 2 and 2A to the upper ends of steel pipe pillars 1 and 1A may be done by any known welding method or by the explosively formed joint of the present invention or by both. Reference numerals 6 indicates a foundation and numerals 7 and 8, gusset plates.

Figure 5:
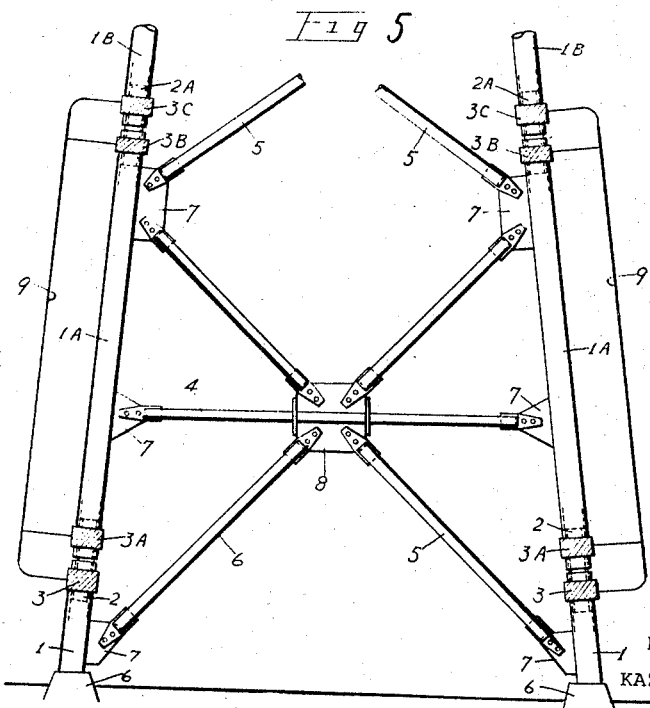
FIG. 5 is a front view showing a different embodiment of the manner of assembling a steel pipe tower according to the present invention.

According to another embodiment of the present invention, common hollow steel pipes are used as the basic structural members. As shown in FIG. 5, a tubular anvil 2 is inserted in the inner portions of a lower upper steel pipe 1 and an upper steel pipe 1A. Explosives 3 and 3A are provided on the external surfaces of the ends of the steel pipes at the joint containing the anvil 2 so that an explosively formed steel pipe joint can be formed upon a simultaneous explosion as described for FIG. 4. In this case, therefore, an exploded steel pipe joint can be formed through the use of the same anvil at an upper end of a lower steel pipe pillar and a lower end of an upper steel pipe pillar. In like manner, the tower structure is continued upwards by a pipe 1B, an anvil 2A, and explosives 3B and 3C.

FIG. 6 shows the male-type anvil in use by the present invention concave grooves G in parallel in the circumferential direction and concave grooves G1 in parallel in the axial direction of the anvil and spaced at equal intervals around the circumference thereof. The concave grooves G1 consist of long and short grooves. In this male anvil 2, joint strength against tension is increased due to the concave groove G and that against compression is increased due to the concave groove G1. Therefore, it is rendered possible to obtain an explosively formed steel pipe joint strong enough to resist force from all directions.

FIG. 7 shows one example of the anvil used in FIG. 5. Namely, the anvil 2 is formed at both of its ends with concave grooves G in parallel in the circumferential direction and with concave grooves G1 equally spaced and running in the axial direction. The concave grooves G1 consist of long and short lengths and these lengths occur alternately around the circumference according to the present invention. This structure is intended to increase joint strength against compression in the same manner as that shown in FIG. 6.

FIG. 8 shows an example of an anvil for use in jointing steel pipe pillars of different diameters. This anvil consists of a tubular portion 2D of a smaller diameter, another tubular portion 2B and a tapered tubular portion 2C. On both the exterior of said portion 2B of a larger diameter and on that of said portion 2D of a smaller diameter are provided concave grooves G and G1 in the manner shown in FIGS. 6 and 7.

If it is anticipated that the surface of the steel pipe at the side of the explosives may be damaged by the explosion, is is desirable to paste tapes, soft plastics or paper onto the portion of the pipe to be provided with; the explosive or to those parts of pipe surrounding the explosives beforehand for protection. Also, when using plated steel pipes, it is possible to prevent the plating from stripping off at the time of explosion by providing similar protective means.

The explosives usable in the present invention can be dynamite or a compound consisting of pentaerythritol tetranitrate, hexogen or tetryl as a principal component and with oxidizing agent and a filling material added, all being mixed with an adhering agent such as gum or paraffin, said compound being molded into a sheet or cord-like body for use. The amount and composition of such explosives may be suitably selected depending upon the kind of steel pipes, namely, their material, their size, etc. The explosive used in the examples below was in the form of a sheet consisting of 30 parts of pentaerythritol tetranitrate 50 parts of lead suboxide and 20 parts of paraffin.

*Working Example 1*

By using two kinds of steel pipe such as STK41 (JIS G 3444, tensile strength over 41 kg./mm.$^2$ and yield point over 24 kg./mm.$^2$) and SIK50 (JIS G. 3444, tensile strength over 32 kg./mm.$^2$), explosively formed steel pipe joints of various sizes were manufactured and their tensile strength and compressive strength were measured. The manufacture of these joints was carried out using the anvil of FIG. 6. Table 1 shows the results of these experiments.

TABLE 1.—TENSILE STRENGTH AND COMPRESSIVE STRENGTH OF EXPLOSIVELY FORMED STEEL PIPE JOINTS

| Kind of steel, STK | External diameter of steel pipe (mm.) | Thickness of steel pipe (mm.) | Sectional area of steel pipe (m.$^2$) | Explosive agent (g.) | Strength (calculated value) (kg.) | Experimental value (minimum) | |
|---|---|---|---|---|---|---|---|
| | | | | | | Tensile strength (kg.) | Compressive strength (kg.) |
| 41 | 60.5 | 2.6 | 4.729 | 160 x 2 | 19,389 | 20,400 | 19,800 |
| 41 | 60.5 | 2.9 | 5.248 | 170 x 2 | 21,516 | 22,800 | 22,000 |
| 41 | 76.3 | 2.6 | 6.02 | 180 x 2 | 24,680 | 25,800 | 25,200 |
| 41 | 76.3 | 2.9 | 6.69 | 190 x 2 | 27,420 | 29,000 | 28,100 |
| 41 | 89.1 | 2.6 | 7.07 | 200 x 2 | 28,970 | 29,500 | 28,500 |
| 41 | 89.1 | 2.9 | 7.87 | 210 x 2 | 32,200 | 34,300 | 30,100 |
| 41 | 89.1 | 3.2 | 8.64 | 220 x 2 | 35,410 | 39,300 | 35,300 |
| 41 | 101.6 | 2.9 | 8.99 | 240 x 2 | 44,950 | 49,000 | 46,700 |
| 41 | 101.6 | 3.2 | 9.89 | 250 x 2 | 49,460 | 55,600 | 52,200 |
| 50 | 101.6 | 3.5 | 10.79 | 260 x 2 | 53,950 | 58,400 | 55,800 |
| 50 | 114.3 | 2.9 | 10.15 | 320 x 2 | 50,750 | 58,900 | 53,400 |
| 50 | 114.3 | 3.2 | 11.17 | 330 x 2 | 55,850 | 60,300 | 57,700 |
| 50 | 114.3 | 3.7 | 12.86 | 340 x 2 | 64,300 | 70,000 | 66,600 |
| 50 | 139.8 | 3.5 | 14.99 | 420 x 2 | 74,950 | 81,000 | 75,100 |
| 50 | 139.8 | 4.0 | 17.08 | 430 x 2 | 85,350 | 96,900 | 89,300 |
| 50 | 139.8 | 4.5 | 19.13 | 440 x 2 | 95,650 | 99,800 | 95,800 |

As is evident in the above table, the steel pipe joints of the present invention have tensile strengths and compressive strengths larger than their calculated values. So they have been found sufficient for practical use as joints in steel pipe towers.

Working Example 2

Two steel towers were built by the method shown in FIG. 4 using the anvil as shown in FIG. 6. The kind of steel tower, steel pipe pillars used therein, amounts of explosive agents and other basic data are shown in the following table.

TABLE 2.—BASIC DATA FOR ESTABLISHMENT OF STEEL TOWER

| Form of steel tower | Height on the ground (m) | External diameter of steel pipe ($\phi$) | Number of joints for main pillar material | Steel required for main pillar material (kg.) | Weight of tower (kg.) | Amounts of explosive agent (kg.) |
|---|---|---|---|---|---|---|
| 66 kV., 2 circuits quadrangular steel tower | 19 | 42.7–89.1 | 20 | 100 | 2,000 | 4.5 |
| 220 kV., 2 circuits quadrangular steel tower | 36 | 49.6–139.8 | 32 | 270 | 7,200 | 18.6 |

While the present invention has been explained with reference to some working examples, it is by no means limited to such examples. It is possible to make various modifications and alterations in design without departing from the scope of the annexed claims.

What is claimed is:

1. Steel pipe tower especially suited for assembly by explosives, comprising pipe pillars having a male-type anvil at one end of each pillar and a female-type hollow portion at the other end for mutual engagement, said anvil having on its external surface a plurality of concave grooves in parallel in the circumferential direction and a plurality of concave grooves of two different lengths, short and long, in an alternate manner in the axial direction of said anvil, the latter grooves being in contact with the former grooves at right angles.

2. A pipe joint especially suited for tower construction by explosive forming, comprising a pipe pillar and an anvil, said anvil having at one end a plurality of concave grooves in parallel in the circumferential direction on its external surface and a plurality of concave grooves in the axial direction of said anvil at right angles to the grooves in the circumferential direction, said pipe pillar assembled in mating engagement onto said anvil end over said grooves, the portion of said pillar over said grooves being sunken into locking engagement with said grooves.

3. A pipe joint as claimed in claim 2, said grooves in the axial direction being sequenced in alternately long and short lengths around the circumference of the anvil.

4. A pipe joint as claimed in claim 3, said grooves in the axial direction being in contact with at least one of the grooves in the circumferential direction.

5. A pipe joint as claimed in claim 4, there being grooves at the other end of said anvil in locations symmetrical to the locations of the grooves at the first end.

6. A method of constructing a pipe tower by the connection of pairs of main pipe pillars by way of anvils, comprising the steps of forming on the external surface of an end of an anvil a plurality of annular grooves and a plurality of longitudinal grooves at right angles to the annular grooves, assembling a pillar onto the end of the anvil in a position overlapping the grooves, placing explosive means on the external surface of the pillar in positions confronting at least the concave grooves of the anvil, and exploding the explosive means, thereby deforming the groove overlapping portions of the pillar into mating relationship with the grooves of the anvil.

7. A method as claimed in claim 6, the step of forming being carried out to provide said longitudinal grooves in an alternating sequence of long and short grooves around the circumference of the anvil.

8. A method as claimed in claim 6, the step of forming including an abutting of said longitudinal grooves with at least one of said annular grooves.

9. A method as claimed in claim 6, the step of forming including the symmetrical placing of said grooves at both ends of the anvil.

References Cited

UNITED STATES PATENTS

| | | | |
|---|---|---|---|
| 587,695 | 8/1897 | Billing | 285—382.2 |
| 799,176 | 9/1905 | Marble | 285—382.2 |
| 1,797,691 | 3/1931 | Merrill | 285—382.2 |
| 2,367,206 | 1/1945 | Davis | 285—382.2 |
| 3,055,095 | 9/1962 | Barry | 285—382.2 |

FOREIGN PATENTS 766,741  1957  Great Britain.

FRANK L. ABBOTT, *Primary Examiner.*

PRICE C. FAW, JR., *Assistant Examiner.*

U.S. Cl. X.R.

29—421, 516; 52—127, 726; 287—109